Oct. 30, 1962 R. M. SMOLL 3,060,971
CLUTCH OR BRAKE DIAPHRAGM
Filed June 20, 1960

*INVENTOR.*
R. M. Smoll

BY *John H. Widdowson*
ATTORNEY

United States Patent Office 3,060,971
Patented Oct. 30, 1962

3,060,971
CLUTCH OR BRAKE DIAPHRAGM
Richard M. Smoll, 1616 Perry, Wichita, Kans.
Filed June 20, 1960, Ser. No. 37,186
5 Claims. (Cl. 137—795)

This invention relates to a diaphragm. In a more particular aspect this invention relates to a new diaphragm for use with a clutch or brake. Still more specifically, the invention relates to a new clutch or brake diaphragm designed and constructed to be mounted between clutch or brake plates to form therebetween when mounted a fluid receiving chamber with one of the plates, and having when formed a permanent raised annular portion. In another aspect the invention relates to a construction of a diaphragm which permits the use of a semi-resilient plastic material of high heat resistant characteristics for a clutch or brake.

Clutch and brake apparatus have long been known in the prior art. Some of these mechanisms utilize a flexible diaphragm which stretches to create a chamber for operating fluid which upon introduction of the fluid into the chamber forces friction surfaces into contact. Fluid introduced into the diaphragm permits equal expansion forces on all portions of the plates. The diaphragms of the prior art are made of a loose, flexible, resilient material which lies loosely between the plates and are positioned therein by stretching when mounting, or other similar means. The prior art diaphragms are generally constructed so that they will easily lose their shape, and in some instances do not retain their mounted position between the plates. This causes unequal forces to be applied to the various portions of the plates when fluid is introduced into the diaphragm. Also, many of the prior art diaphragms are not made of heat resistant materials and will fail when subjected to the high heat generated by the clutch or brake plates on which and between which they are mounted. Suitable heat resistant plastic materials, reinforced preferably, are known to the art but no satisfactory diaphragms or structures have been made from the materials for brakes or clutches due to the poor abrasion resistance properties of the material. The difficulties with the prior art devices and materials hereinbefore specified increase failure of these diaphragms, with a resulting increase in cost due to the excessive maintenance and the number of diaphragms required for any period of operation.

I have invented a satisfactory diaphragm structure which can and does utilize the desirable heat resistant but only semi-resilient plastic materials, such being most desirably employed in plate-type brakes or clutches.

In accordance with the present invention, a new diaphragm for clutch or brake assemblies has been provided which overcomes the objections of the prior art devices. This diaphragm is especially useful with the clutch or brake construction shown and described in the copending application Serial No. 680,568, now Patent No. 2,941,642, filed August 27, 1957, and entitled Clutch or Brake, however it will be obvious to those skilled in the art that the diaphragm is usable or adaptable for use in other types of brake or clutch assemblies utilizing a diaphragm. The diaphragm is secured to one of two facing plates, and forms a chamber with the plate on which it is secured. Fluid, which can be either a liquid or a gas, is introduced into the chamber to force friction surfaces into engagement.

The diaphragm of the invention is preferably a shape formed and only semi-resilient member of plastic material, preferably reinforced. A raised annular portion is formed in the member. Means are provided to mount the member onto a clutch or brake plate. The diaphragm is mounted on a clutch or brake plate and forms a fluid chamber with the plate, and means are provided to introduce fluid under pressure into the chamber. The material from which the diaphragm is formed is preferably relatively stiff and only semi-resilient so that the roll on the edge of the annular portion retains its shape during operation. In use, the center of the raised portion is depressed by the clutch or brake plates, forming ridges in the diaphragm. Suitable recesses can be formed in the plates to receive one or more of the ridges. The diaphragm is preferably made of a suitable semi-resilient material, such as a fiberglass reinforced silicone rubber or other relatively hard synthetic rubber, and preferably is a highly heat resistant material.

Accordingly, it is an object of the invention to provide a new clutch or brake diaphragm.

Another object of the invention is to provide a new clutch or brake diaphragm which can be accurately and permanently positioned on a clutch or brake plate.

A still further object of the invention is to provide a new diaphragm formed of a heat resistant, semi-resilient material which will increase the useful life of the diaphragm.

A further object of the invention is to provide a new clutch or brake diaphragm permanently formed in the shape of the expanded diaphragm to eliminate or substantially reduce stretching of the diaphragm in use, and permit the use of heat resistant materials having poor abrasive resistant characteristics.

Still another object of the invention is to provide a new clutch or brake diaphragm made of a heat resistant, reinforced semi-resilient rubber-like material.

Various other objects, advantages and features of the invention will become apparent from the following description taken in connection with the accompanying drawings, in which.

Figure 1:
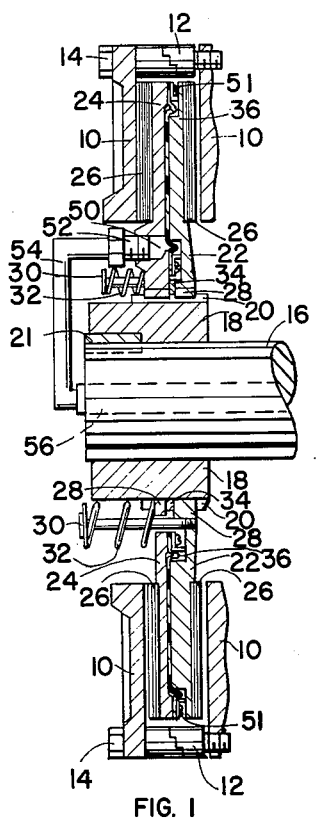
FIG. 1 is an elevation view partly in cross section through a clutch assembly utilizing the new diaphragm of the invention.

The following is a discussion and description of a preferred specific embodiment of the new diaphragm for a clutch and brake assembly of the invention, such being made with reference to the drawings whereon the same reference numerals are used to indicate the same or similar parts and/or structure. It is to be understood that such discussion and description is not to unduly limit the scope of the invention.

Referring now to the drawings in detail, FIG. 1 of the drawings shows a clutch mechanism having the diaphragm of the invention in position thereon. The details of the clutch structure are explained and shown in full in the before mentioned patent and will be referred to briefly here for an explanation of the working of the diaphragm in such a mechanism.

The clutch mechanism includes a pair of plates 10 which are connected as desired to other operating means (not shown). The plates 10 have frictional surfaces on the inside or facing surfaces thereof. Adjustable spacing members 12 around the outer portion of the plates 10 secure the plates in assembled relation. Bolts 14 pass through holes in the plates 10 and mount the adjustable spacers 12. The annular plates 10 are mounted coaxial to the shaft 16 on which the rotational force is exerted. A collar member 18 having splines 20 is mounted on the shaft 16 in any suitable manner, such as by the key 21.

A second pair of friction plates is used, such as the plates 22 and 24. The outside of the plates 22 and 24 are built up with suitable friction exerting material 26 to provide frictional surfaces on the plates 22 and 24. In operation the frictional surfaces of the material 26 engage the annular frictional surfaces on the plates 10. The inner portion of the plates 22 and 24 have teeth 28 which fit into the splines 20 of the collar 18. The plates 22 and 24 can thus move back and forth in operation to engage the friction surfaces of the device.

A plurality of bolts 30 pass through apertures in the plate 24 and are threadedly secured to the plate 22. The bolts 30 mount helical springs 32 which are in compression and which urge the plates 22 and 24 together to disengage the frictional surfaces. In order to provide for the plates 22 and 24 to come back to the desired central position, a split ring positioning member 34 is mounted around the hub 18 on splines 20. The split ring 34 snugly engages the splines 20 under spring tension.

Figure 2:
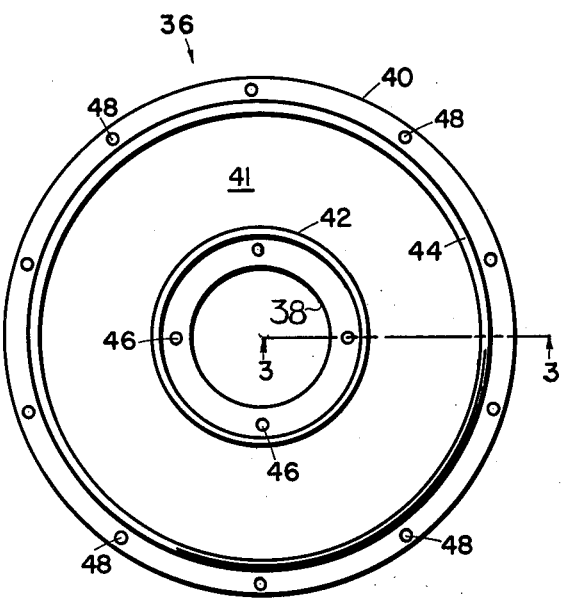
FIG. 2 is a plan view of the diaphragm of the invention.
Figure 3:
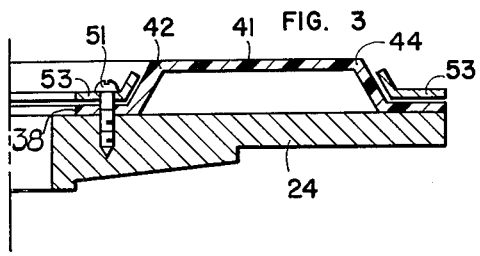
FIG. 3 is an enlarged cross section view taken along the line 3—3 of FIG. 2 showing the diaphragm mounted on a clutch or brake plate.

The annular diaphragm of the invention is mounted on the plate 24 and is shown generally at 36. The diaphragm 36 is a circular member having a central opening 38 and a concentric outer periphery 40. The diaphragm 36 is preferably formed in the shape shown in FIGS. 2 and 3. This is approximately the shape of the diaphragm when inflated, and includes a raised annular portion 41 between the opening 38 and the outer periphery 40. The rolls or edges 42 and 44 between the annular portion 41 and the flat edges of the diaphragm form ridges in use as shown in FIG. 1. Mounting holes 46 are provided between the central opening 38 and the annular portion 41, and the holes 46 are preferably symmetrically arranged. Additional mounting holes 48 are provided and are positioned between the annular portion 41 and the outer periphery 40 of the member. The groups of rows 46 and 48 are preferably concentric, and the holes in the individual rows or groups are preferably equally spaced around the diaphragm 36. Mounting bolts 51 pass through the holes 46 and 48 and secure the diaphragm in position on the plate 24. Annular mounting rings 53 can be used to insure a sealing fit between the diaphragm 36 and the plate 24.

The diaphragm can be constructed of various known materials, however a preferred material of construction is fiberglass reinforced, semi-resilient silicone rubber material. The reinforcing material used should be one which will give the diaphragm the necessary strength to withstand the forces to which it is subjected during operation, such as fiberglass, asbestos fibers, etc. The silicone rubber material specified hereinabove is desirable due to its good heat resistant properties, which is highly desirable in a clutch or brake application due to the relatively high temperatures involved and the rapid temperature changes encountered. The diaphragm is semi-resilient when made from these materials, which has been found advantageous, because it maintains its shape, particularly as far as the annular portion 41 is concerned so that it is permanently formed on the surface of the diaphragm 36. The formation of the ridges at 42 and 44 in use eliminates any possibility of the diaphragm 36 being accidentally displaced from its preferred location in the clutch or brake structure since the ridges are preferably received within suitable mating recesses in the clutch or brake structure. This positive alignment of the diaphragm relative to the supporting and adjacent structure is an important feature of the invention, since it aids in preventing creases and the like being formed in the center portion of the diaphragm during operation, which causes premature failure of diaphragms in the prior art devices.

Another material which has suitable physical properties to be useable as a diaphragm is the polyester resin sold by the United States Rubber Company under the trademark of Vibran 136A. This material is specifically designed for high heat uses, and provides good strength at temperatures of 500 degrees F. and over. Other materials which have good heat resistant properties would be suitable in this application and include semi-resilient rubber or synthetic rubber materials, other suitable plastics, etc. Also, suitable reinforcing materials other than the fiberglass material mentioned can be used if desired.

When diaphragm 36 is secured to the plate 24 as hereinbefore described, a chamber is formed between the plate 24 and the diaphragm 36. The plate 24 has an aperture 50 formed therein and a connector 52 is threadedly received in the aperture 50. The connector 52 receives one end of a flexible hose or pipe 54, and the other end of the hose or pipe 54 is suitably mounted in the outer end of a conduit 56 through the shaft 16.

In operation, fluid, which can be either a gas or liquid, is passed through conduit 56, hose or pipe 54 and aperture 50 into the chamber formed by the diaphragm 36 and the plate 24. Any suitable means can be used to force the operating fluids through these conduits into the chamber. When the fluid under pressure is introduced into this chamber, the diaphragm 36 expands to approach its formed shape and forces the plates 22 and 24 apart. This brings the friction surfaces of the member 26 into contact with the friction surfaces of the plates 10. The plates 10 then turn with the shaft 16 and the collar 18 mounted thereon. The ridges formed from the rolls or edges 42 and 44 of the diaphragm when deflated are received in recesses in the plate 22 as shown in the drawings.

The provision of a preshaped diaphragm having an annular raised portion as shown at 41, with a roll or edge at 42 and 44, permits the use of semi-resilient materials having relatively poor abrasion resistant properties in a diaphragm which heretofore could not be used due to abrasion, particularly at the roll areas 42 and 44 during expansion and contraction of the diaphragm. By this construction, materials having good heat resistant and relatively poor abrasion resistant properties can be used, such as the silicone rubber material hereinbefore mentioned. Stretching of the diaphragm at critical areas is eliminated, thus increasing the life of the diaphragm. The new diaphragm structure of my invention and the semi-resilient materials utilized has proven successful in operation, giving long life and great resistance to heat.

It will be evident to those skilled in the art that various modifications of the invention can be made or followed in the light of this disclosure, without departing from the spirit of the disclosure or from the scope of the claims.

I claim:

1. A diaphragm for a clutch or brake mechanism comprising, a thin integral annular member of constant material thickness constructed of a fiberglass reinforced semi-resilient silicone rubber material, said member having circular, flat and narrow coplanar mounting portions around the radially inner and radially outer edge portions thereof, each of said mounting portions having a plurality of spaced holes therethrough adapted to receive mounting bolts to secure said member to a clutch or brake plate, said member in its unstressed shape having a wide, annular, flat and substantially raised portion between said mounting portions in a plane substantially parallel to and in spaced relation to said mounting portions, said last-named portion being of resiliency and constructed to be depressible across the major radial dimension thereof by force exerted by a clutch or brake plate in contact therewith and expandable in use to its unstressed shape by force exerted by a fluid in contact therewith with the radially outer and inner edge portions thereof forming flex areas and cooperating with the clutch or brake plate to prevent radial displacement of said member.

2. A diaphragm for a clutch or brake mechanism comprising, a relatively thin, annular member constructed of a semi-resilient material and having mounting portions at the radially inner and radially outer edge portions thereof, each of said mounting portions having means therewith to receive mounting means to secure said member to a clutch or brake plate, said member in its unstressed shape having an annular substantially raised portion extending between said mounting portions, said raised portion extending a major portion of the width of said annular member and positioned in a plane substantially parallel to and in spaced relation to said mounting portions, said raised portion being of resiliency and constructed to be depressible across the major radial dimension thereof by force exerted by a clutch or brake plate in contact therewith and expandable in use to its unstressed shape by force exerted by a fluid in contact therewith with the radially outer and inner edge portions of said last-named portion forming flex areas and cooperating with the clutch or brake plate to prevent radial displacement of said member.

3. The diaphragm as recited in claim 2 wherein said material is a fiberglass re-inforced semi-resilient silicone rubber material.

4. A diaphragm for a clutch or brake mechanism comprising, a circular member having a centrally located opening therein and constructed of a semi-resilient material and having flat and narrow mounting portions at the radially inner and radially outer edge portions thereof, said member in its unstressed shape having an annular and substantially raised flat portion positioned between said mounting portions and extending a major portion of the distance between said mounting portions, said last-named portion being positioned in a plane substantially parallel to and in spaced relation to said mounting portions, said last-named portion being of resiliency and constructed to be depressible across the major radial dimension thereof by force exerted by a clutch or brake plate in contact therewith and expandable in use to its unstressed shape by force exerted by a fluid in contact therewith with the radially outer and inner edge portions thereof forming flex areas and cooperating with the clutch or brake plate to prevent radial displacement of said member.

5. The diaphragm is defined in claim 4 wherein said material is a fiberglass re-inforced silicone rubber material.

References Cited in the file of this patent

UNITED STATES PATENTS

| 2,370,360 | McLean | Feb. 27, 1945 |
| 2,520,771 | Martin | Aug. 29, 1950 |
| 2,808,484 | Beck | Oct. 1, 1957 |

FOREIGN PATENTS

| 617,751 | Great Britain | Feb. 10, 1949 |